Aug. 18, 1964    E. E. FRANCISCO, JR    3,144,769
MEANS FOR MEASURING MASS FLOW RATE OF FLUID FLOW
Filed April 4, 1960    2 Sheets-Sheet 1

INVENTOR.
EDWARD E. FRANCISCO, JR.
BY
*Christie, Parker & Hale*
ATTORNEYS.

Aug. 18, 1964  E. E. FRANCISCO, JR  3,144,769
MEANS FOR MEASURING MASS FLOW RATE OF FLUID FLOW
Filed April 4, 1960  2 Sheets-Sheet 2

INVENTOR.
EDWARD E. FRANCISCO, JR.
BY
ATTORNEYS.

United States Patent Office 3,144,769
Patented Aug. 18, 1964

3,144,769
MEANS FOR MEASURING MASS FLOW
RATE OF FLUID FLOW
Edward E. Francisco, Jr., Woodland Hills, Calif., assignor, by mesne assignments, to Brooks Instrument Company, Inc., Hatfield, Pa., a corporation of Pennsylvania
Filed Apr. 4, 1960, Ser. No. 19,718
1 Claim. (Cl. 73—231)

The invention relates to means for measuring and indicating the mass flow rate of a fluid, particularly means involving the disposition of rotatable elements in the fluid flow.

It is conventional to measure the volumetric rate of flow of a fluid by disposing a rotatable propeller or turbine in the fluid flow to be rotated thereby and correlating the rotational speed of the propeller or turbine with the volumetric rate of fluid flow. This is based on the established phenomenon that such a propeller or turbine, if freely suspended in the fluid flow, will rotate at a particular speed, known as the free running speed, which is a direct function of and directly characterizes the average velocity of the fluid flow through the plane of rotation of the propeller or turbine.

However, it is often of crucial importance to know the mass flow rate of the fluid rather than merely its volumetric flow rate. It is known that the mass flow rate of a fluid may be obtained by giving the fluid a rotary motion to produce a tangential acceleration thereof in a plane of rotation transverse to the direction of fluid flow and measuring the torque which is required to produce such tangential acceleration, such torque per unit of rotational speed being directly proportional to the average mass flow rate. Devices are known which accomplish this. These devices commonly involve a flow passage which is rotated by separate means, such as an electric motor. The fluid flows through the rotating flow passage and thus receives a tangential acceleration. The rotating element is either a segment of the main fluid conduit itself or a flow passage rotor disposed within the main fluid flow passage and rotated by an electric motor likewise disposed within the fluid flow passage. The complexity and hence expense and unreliability of these devices are apparent. Moreover, the complexity, size and weight of these devices may make them unsuitable for many applications, such as liquid fuel rockets and other air-borne installations.

My invention is extremely simple, reliable, and effective means for measuring mass flow rate and, at the same time, measuring the volumetric flow rate of fluid flow.

The basic physical phenomena on which the invention is based are the above stated turbine free running speed principle and the principle that restraining such a turbine so that it rotates, but at a speed different than its free running speed, produces a tangential acceleration of the fluid in the plane of rotation of the turbine and thus requires the application of a torque to the turbine to produce the restraint. This torque, from principles of conservation of momentum, is directly proportional to the product of a unit mass of the fluid flow multiplied by the square of its tangential velocity. Mathematically, the torque may be expressed by the following formula:

$$T = kmV^2$$

where T is the torque, $k$ is a proportionality factor, $m$ is a unit mass of the fluid, and V is the tangential velocity of the fluid.

The quotient of this torque, represented by the product of a unit mass of the fluid flow multiplied by the square of the tangential velocity of the fluid, divided by the tangential velocity of the fluid is directly proportional to the mass flow rate of the fluid. Mathematically, this may be expressed as follows:

$$M = \frac{k'mV^2}{V}$$

where M is the mass flow rate of the fluid, $k'$ is a proportionality factor, $m$ is a unit mass of the fluid, and V is the tangential velocity of the fluid. Since the tangential velocity and angular velocity of the fluid are directly proportional, the angular velocity of the fluid may be substituted for the tangential velocity in the above through a slight modification of the proportionality factor $k'$.

The method of the invention comprises rotatably mounting a bladed rotor or turbine in a fluid flow passage for rotation responsive to fluid flow, restraining it from its free running speed by an amount which bears a constant proportion to its free running speed, and indicating the torque required for such restraint in relation to the rotational speed of the rotor.

Apparatus to implement the method of the invention takes the form of a bladed rotor rotationally mounted in a fluid flow passage with its axis of rotation parallel to the direction of fluid flow, means, preferably a second coaxial rotor of different free running speed torsionally coupled to the first rotor for equal rotational speeds, for torsionally restraining the first rotor to rotate at a constant proportion of its free running speed, and means for sensing the magnitude of the restraining torque per unit of rotational speed, which is directly proportional to the mass flow rate of the fluid. Means may also be provided for sensing the rotational speed of the rotors, which is directly proportional to the volumetric flow rate of the fluid flow. The apparatus of the invention may take various embodiments.

The invention and its advantages will be more fully understood by reference to the following detailed description thereof taken in conjunction with the accompanying drawings, in which.

The method of the invention comprises: First, disposing a bladed rotor or turbine in a fluid flow passage for rotation responsive to fluid flow in a plane transverse to the direction of the fluid flow. As before mentioned, such a rotor will rotate at a definite speed, or free running speed, which is directly proportional to the average velocity of the fluid flow passing through it. The free running speed varies directly as the average velocity of the fluid flow varies. Second, restraining the rotor from rotating at its free running speed. The restraint of speed of the rotor may be either a greater or a lesser speed than the free running speed, the latter being preferred, and bears a constant proportion to the free running speed of the rotor. This proportionality is necessary so that there will be proportionality between the torques required to produce such restraint for the various free running speeds of the rotor. The restraint is such that the rotor, although restrained from its free running speed, nevertheless rotates. This restrained rotational speed of the rotor will be directly proportional to the average velocity of fluid flow. And third, indicating the torque required to produce such restraint of the rotor per unit of rotational speed. This quantity is the quotient of the torque divided by the rotational speed and is directly proportional to the mass flow rate of the fluid. Preferably, the torque is indicated in terms of the angle of torsional deflection of a member connected to the rotor which restrains the rotor and to which the torque is applied, such angle of torsional deflection being directly proportional to the torque applied thereto, and if, as preferred, the time required for rotational angular displacement of the rotor through the angle of torsional deflection is measured, such time period is directly proportional to the desired quotient.

Figure 1:
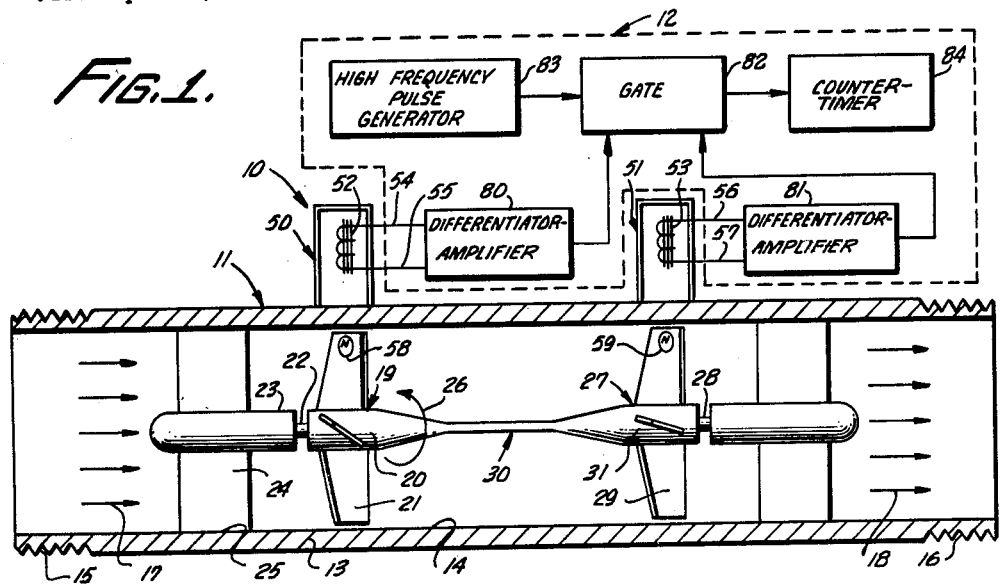
FIG. 1 illustrates schematically and partially in longitudinal section an embodiment of the invention.

Referring now to FIG. 1, a mass flow meter embodying the invention which is adapted to practice the method of the invention is represented generally by the reference numeral 10. The mass flow meter 10 is comprised of two major components: the meter located in and closely adjacent to the fluid flow to be measured, designated generally by the reference numeral 11, and the measuring apparatus, normally located relatively remote from the fluid flow, enclosed within the dashed line and indicated generally by the reference numeral 12.

The meter 11 has a body 13 of fluid impermeable material which defines an internal fluid flow passage 14 adapted to define axial flow of fluids through the body. In FIG. 1, the body is shown in longitudinal section. The body 13 is interposed in the conduit conveying the fluid flow which is to be measured with the mass flow meter, and to facilitate this, each end of the body may bear external threads 15 and 16 adapted to receive a suitable coupling attached to the conduit in which the meter 11 is to be interposed. The meter is disposed in the conduit oriented for fluid flow through the flow passage 14 in the direction indicated by the arrows 17 and 18.

Within the flow passage 14 there is disposed a first rotor 19 comprised of a hub portion 20 and a plurality of identical rotor blades, such as the blade 21, extending radially outwardly from the hub at substantially right angles thereto and spaced symmetrically about the hub. Only four rotor blades are illustrated, but two or any larger number may be provided. The hub 20 has a reduced shaft portion 22 which is journalled as frictionlessly as possible in a bearing 23. The bearing 23 is supported centrally in the flow passage 14 by means of a plurality of identical supports, such as the support 24, which extend at right angles from bearing 23 to the face of the flow passage 14 to which they are rigidly attached, as at 25. The supports 24 are designed so that they offer minimal frontal area to the fluid flow and are preferably streamlined in cross section to minimize drag and turbulence of the fluid flow. The shaft portion 22 of the hub 20 is oriented in the bearing 23 so that the axis of rotation of the first rotor is parallel to the direction of fluid flow and centrally located in the flow passage 14. Each rotor blade 21 is equally inclined relative to the axis of rotation of the rotor 19 in the same quadrant so that fluid flow impinging upon the upstream faces of the blades 21 will cause the rotor 19 to rotate in the direction indicated by the arrow 26 in FIG. 1. Preferably the flow passage 14 is circular in section transverse to the fluid flow. The rotor blades 21 extend from the hub of the rotor to as close as possible to the surface of the flow passage 14 in order that the unrestrained rotational speed of the rotor responsive to fluid flow will characterize the average velocity of the entire fluid flow through the flow passage 14. The fluid flow may be either liquid or gas flow.

A second rotor 27 is disposed within the flow passage 14 in spaced relation from the first rotor 19 longitudinally of the flow passage with its axis of rotation coaxial with the axis of rotation of the first rotor. The second rotor 27 and its bearing and bearing supports are in all respects identical to the first rotor 19 and its bearing and bearing supports, with the obvious exception that the trailing edge of the hub 31 second rotor bears the rotatively mounted shaft portion 28 and the important exception that the angular inclination of the rotor blades 29 of the second rotor relative to its axis of rotation is different, preferably less, than the corresponding inclination of the rotor blades 21 included in the first rotor 19. The rotor blades of both rotors are inclined in the same quadrant. The different inclinations of the rotor blades on the first and second rotors result in the rotor with blades of the lesser inclination having a lesser free running speed responsive to fluid flow than the other rotor, since the free running speed of the rotors is directly proportional to the angle of inclination of their rotor blades relative to their axis of rotation. Coupling the two rotors together so that they are restrained to rotate at the same rotational speed about their common axis of rotation results in each rotor restraining the other from its free running speed, so that one rotor rotates faster and the other slower than their respective free running speeds. The restraint in rotational speed of each rotor bears a constant proportion to its free running speed because the restraint is directly proportional to the free running speed of the other rotor, which in turn is directly proportional to the velocity of fluid flow, to which the free running speed of the restrained rotor is also directly proportional.

Torque responsive coupling means 30 connects the hubs 20, 31 of the first and second rotors. The coupling means is such that it requires the first and second rotors to rotate at the same angular speed but torsionally deflects responsive to the torque imposed thereon as a result of the different free running speeds of the two rotors. Thus, the coupling means 30 requires the first and second rotors to rotate at the same angular speed about their common axis of rotation but permits the first and second rotors to angularly displace from one another about their common axis of rotation responsive to the torque imposed upon the coupling 30 by the rotors. The coupling means 30, so long as it meets the above requirements, may take various forms.

As shown in FIG. 1, the coupling means 30 is a member extending between the hubs of the first and second rotors with its central axis coincident with the axis of rotation of the rotors. The member is connected to the hub of each rotor, and, although such connection may be of any conventional type sufficient to rigidly attach the member to the hub, it is preferred that the member be made integrally with the hubs, as illustrated in FIG. 1. The member is of such cross sectional area and longitudinal extent that it will resiliently angularly displace about its central axis responsive to the torque imposed thereon by the rotors. The member may have any set of dimensions, depending upon the characteristics of the fluid flow, the design of the rotors, and the physical properties of the material from which the member is made, which may be metal or plastic or the like.

Figure 4:
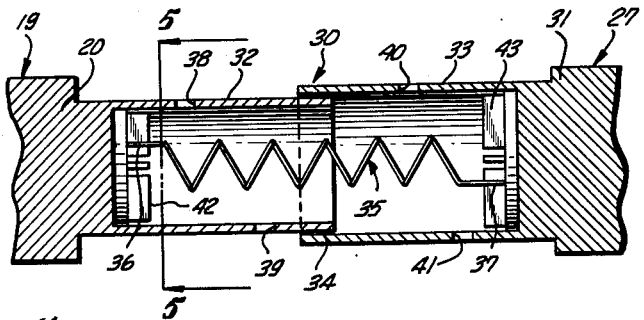
FIG. 4 illustrates schematically and partially in longitudinal section another modification of the embodiment illustrated in FIG. 1.
Figure 5:
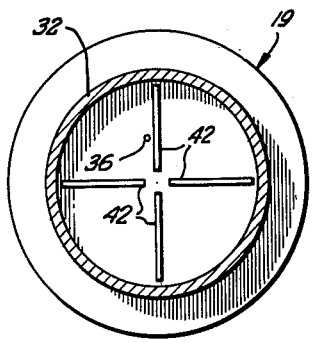
FIG. 5 is a transverse sectional view along the line 5—5 in FIG. 4.

FIGS. 4 and 5 illustrate schematically another embodiment of the coupling 30. As shown in FIG. 4, the hub 20 of the first rotor 19 has a first cylindrical sleeve 32 extending therefrom toward the second rotor 27 concentrically with the axis of rotation of the rotors. The sleeve 32 is attached to or formed integrally with the hub 20 of the first rotor. Similarly, the second rotor 27 has a second cylindrical sleeve extending from its hub 31 toward the first rotor 19 concentrically with the axis of rotation of the rotors. In FIG. 4, the hubs and sleeves are shown in longitudinal section. Both sleeves terminate intermediate the first and second rotors. The internal diameter of the second sleeve 33 is slightly greater than the outside diameter of the first sleeve 32 so that the second sleeve overlaps the first sleeve at 34 in sliding engagement therewith. An elongated torsion spring 35 is disposed within the sleeves 32 and 33 with its longitudinal axis concentric with the axis of rotation of the rotors and with its first end 36 attached to the hub 20 of the first rotor 19 and its second end 37 attached to the hub 31 of the second rotor 27. The torsion spring 35 may be either helical, as schematically shown in FIG. 4, or, if desired, the sleeves 32 and 33 may be shortened and a spiral spring utilized. The first sleeve 32 has apertures 38 and 39 in its walls communicating between its internal bore and the exterior of the sleeve, and the second sleeve 33 has similar apertures 40 and 41. Damping blades 42 are disposed within the bore of the first sleeve 32 and similar damping blades 43 are disposed within the bore of the second sleeve 33. As shown in FIGS. 4 and 5, the damping blades extend into the bore of the sleeves longitudinally of the axis of rotation thereof and outwardly radially about such axis of rotation, but other configurations of damping blades may be used, as for example, radially inwardly extending blades disposed longitudinally along the internal walls of the two sleeves. The fluid medium in which the coupling 30 is disposed passes from the flow passage 14 in the body through the apertures 38, 39, 40 and 41 into the internal bores of the sleeves 32 and 33 and, if the fluid is a liquid, causes the damping blades to damp changes of angular position of the two sleeves 32 and 33 relative to each other about their common axis of rotation. This damping action of the coupling 30 shown in FIGS. 4 and 5 is one of its advantages. Other advantages are that the spring 35 may be removably mounted in the hubs of the first and second rotors to facilitate its replacement with springs of different stiffness to vary the capacity of the meter for accommodation of different conditions of fluid flow, or to vary the torsional deflectional responsiveness of the coupling to given fluid flow conditions.

Figure 6:
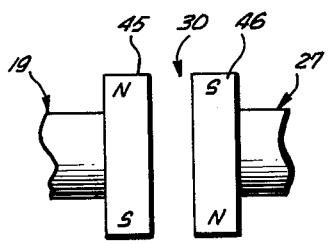
FIG. 6 illustrates schematically another modification of the embodiment illustrated in FIG. 1.

Another embodiment of the coupling 30 is shown in FIG. 6. In this coupling, the first rotor 19 and the second rotor 27 each have magnetically polarized end portions 45, 46 attached to their hubs. The end portions 45, 46 are juxtaposed with opposite polarities of each adjacent, as shown, so that the magnetic attraction therebetween serves as the coupling between the first and second rotors. This form of coupling is advantageous because of its simplicity, resistance to breakage and easy adjustability of its angular deflectional responsiveness by means of varying the gap between the portions 45 and 46 to change its resistance to torsional deflection.

The meter 11 includes sensing means for sensing cyclically rotational motion of each rotor. The sensing means may take various forms.

In FIG. 1, the sensing means is comprised of a first sensing means shown schematically at 50 and a second sensing means shown schematically at 51. The first and second sensing means 50 and 51 each comprise a core of magnetic material 52, 53 with windings of conductor wire having leads 54 and 55 extending from the first sensing means and leads 56 and 57 extending from the second sensing means. Each core and its wire windings are movably mounted on the body 13 by any suitable means, such as a housing threadedly received in the walls of a rotatable annular segment of the body 13, so that they may be rotated about the axis of rotation of the rotors and fixed in a given selected position for calibration of the meter. The first sensing means 50 is aligned with the plane of rotation of the first rotor 19, and the second sensing means 51 is similarly aligned with the plane of rotation of the second rotor 27. The wire windings on each core extend transversely of the plane of rotation of the rotor. Each rotor carries a permanently magnetically polarized element attached to the rotor in fixed angular relation relative to the axis of rotation of the rotor and with its poles lying in the plane of rotation of the rotor. The magnetized element may take the form of an annular permanent magnet mounted in the hub of the rotor or, preferably, as illustrated schematically at 58 in FIG. 1, a permanently magnetized rotor blade or permanent magnetic polarization of the entire rotor with, in either case, the magnetic poles lying in the plane of rotation of the rotor. When the rotors revolve, the magnetic flux of each of their magnetized elements similarly revolves and cuts the wire windings on the cores 52, 53, inducing an alternating current pulse in the circuit to which the leads 54, 55 and 56, 57 are connected. Thus, each rotation of the first rotor 19 is sensed by the first sensing means 50 as a pulse of alternating current, and, similarly, each rotation of the second rotor 27 is separately sensed by the second sensing means 51 as a pulse of alternating current.

For effective penetration of the magnetic flux of the permanent magnets 58, 59 through the body 13, so that it efficiently cuts the wire windings on the cores 52, 53, the entire body 13 may be made of non-magnetic material, or, as preferred, the portion of the body lying in the plane of rotation of each rotor is preferably made of non-magnetic material.

The sensing means 50, 51 may be rotated about the axis of rotation of the rotors and fixed in a selected position on the body 13, and the magnetized portion carried on each rotor is in fixed angular relation to the axis of rotation of the rotor. These fixed positions permit utilization of the pulses of each sensing means for determination of the displacement of one rotor relative to the other angularly about their axis of rotation as a result of the heretofore explained torsional deflection of the coupling means 30 responsive to the torque imposed thereon by the rotors. And the pulses themselves may be utilized for determination of the rotational speed of the rotors, either by measurement of their frequency or their amplitude. If the sensing means 50 and 51 are aligned longitudinally of the body 13 and the poles of the polarized element carried on each rotor are also aligned longitudinally of the body 13, which is the preferred arrangement, it is apparent that, since the periods of the two current pulses are identical due to the equal rotational speed of the two rotors, the phase difference of the current pulses, indicated in time, is directly proportional to the quotient of the angular displacement of one rotor from the other about their axis divided by their common speed of angular rotation. The first and second sensing means 50, 51, although they must be in fixed position on the body 13, need not be longitudinally aligned. The same applies to the poles of the polarized elements carried on each rotor. If such alignment is not present, it is only necessary to calibrate the meter 11 when there is no fluid flow, or a known mass of fluid flow, to obtain the phase difference between the current pulses from the first and second sensing means, and this difference is then used as a datum for interpretation of the phase difference between the two current pulses when there is fluid flow.

Figure 2:
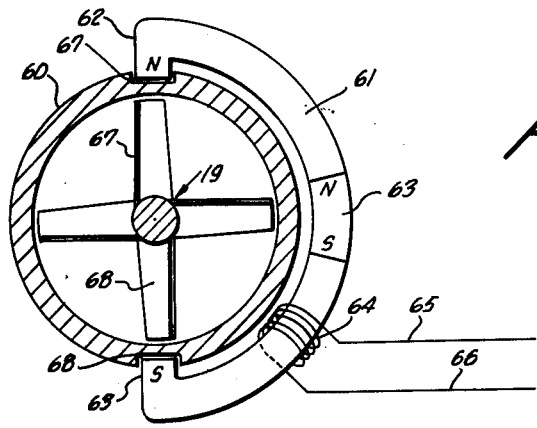
FIG. 2 illustrates schematically and partially in transverse section a modification of the embodiment illustrated in FIG. 1.

FIG. 2 illustrates schematically another embodiment of the sensing means. FIG. 2 is a transverse sectional view through the body 13 looking at either the first or the second rotor. Each rotor has separate identical sensing means, so that a description of one will suffice for a description of the other. Considering FIG. 2 as showing the first rotor 19, an annular segment 60 of the body 13 is oriented in the plane of rotation of the rotor. The segment 60 is made of non-magnetic material. An arcuate member 61 is disposed around the exterior surface of the segment 60 with its ends 62 and 63 oriented on a straight line passing through the axis of rotation of the rotor 19. The member 61 is made of magnetic material having a large coefficient of magnetic permeability and is of such shape as to offer minimal reluctance to magnetic flux. A permanently magnetically polarized segment 63 is interposed in the member 61 with its poles oriented in the plane of the member, and thus in the plane of rotation of the rotor 19. The magnet 63 induces magnetic flux in the member 61 and tends to magnetically polarize its ends 62, 63, as illustrated. Electrically conductive wire windings 64 are disposed about the member 61 and have leads 65, 66 extending therefrom. The conductor wire is oriented on the member 61 so that it extends transversely of the plane of the poles of the permanent magnet 63. In the preferred form, only two diametrically opposed rotor blades of the rotor 19, such as the rotor blades 67, 68, are made of a magnetic material having minimal reluctance to magnetic flux, with the consequence that when the aligned blades 67, 68 are aligned with the ends 62, 63 of the member 61, flow of magnetic flux is permitted from the end 62 to the end 63, and thus from one pole to the other pole of the permanent magnet 63. This flow means that lines of magnetic flux move past the wire windings 64 and are cut, with consequent inducement of an electromotive force in the wire windings 64, which sets up a pulse of current in the circuit to which the leads 65, 66 are connected. To minimize inhibition of the flow of magnetic flux, the ends 62, 63 of the member 61 may be recessed in the non-magnetic portion 60 at 67, 68. With this arrangement, each half revolution of the rotor 19 is sensed by a current pulse in the circuit to which leads 65, 66 are connected. This embodiment has the advantage that the current pulse is unidirectional, which simplifies the measuring apparatus 12. If all of the rotor blades, or more than two diametrically opposed rotor blades, are made of the minimal reluctance magnetic material, the result will be sensing pulses for less than a half revolution of the rotor, which may require a greater discrimination in the measuring apparatus 12, but may be advantageous due to the shorter time interval between sensing pulses, which would enable faster sensing of an angular change of one rotor relative to the other about their axis of rotation and give more accurate measurement of the rotational speed of the rotors. The minimal reluctance rotor blades need not be diametrically opposed, provided they are angularly spaced about the axis of rotation of the rotor, in which case the ends 62, 63 of the element 61 are similarly spaced about the axis of rotation so that the above described magnetic circuit is formed upon coincidence of the blades with the ends of the element 61. The second rotor 27 has separate sensing means identical to the above described sensing means for the first rotor 19. In this embodiment of the sensing means, the member 61 for the first rotor 19 and the similar member 61 for the second rotor 27 are carried on the body 13 in fixed positions relative to the body and relative to each other, and the minimal reluctance rotor blades of each rotor are oriented in fixed angular relation to each other relative to their common axis of rotation. Preferably, the two members 61 are aligned longitudinally of the body, and, similarly, the minimal reluctance rotor blades of the first and second rotors are aligned longitudinally of the body, in the same manner as described above for the sensing means illustrated in FIG. 1. The current pulses emanating from the two sensing means are utilized in substantially the same manner as described above for the sensing means illustrated in FIG. 1, the time interval or phase difference between a pulse from the sensing means for the first rotor 19 and the next following pulse from the sensing means for the second rotor 27 being utilized as a measure of the angular displacement of one rotor from the other about their axis of rotation divided by their speed of rotation, and the number of pulses received from either of the sensing means during a given interval of time, or frequency of the pulses, being utilized, in relation to the angular spacing of the minimal reluctance rotor blades about the axis of rotation of the rotor, to indicate the speed of rotation of the rotors.

Figure 3:
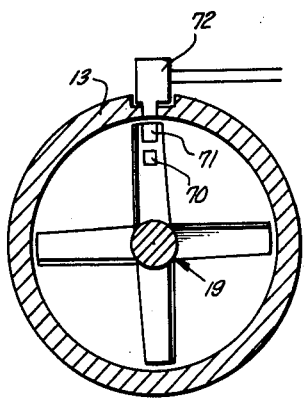
FIG. 3 illustrates schematically and partially in transverse section another modification of the embodiment illustrated in FIG. 1.

FIG. 3 shows schematically another embodiment of the sensing means. The relationship of FIG. 3 to FIG. 1 is the same as above described for FIG. 2, and, as in FIG. 2, FIG. 3 will be considered as showing the first rotor 19. The second rotor 27 has separate sensing means identical to that of the first rotor 19 so that a description of one will suffice for the other. In this embodiment, a radioactive emitter is carried on the rotor in its plane of rotation in fixed angular relation relative to the axis of rotation of the rotor. The emitter is adapted to radiate in a fixed predetermined radial segment of the plane of rotation of the rotor. As illustrated schematically in FIG. 3, the radioactive emitter may be an element 70 in one of the rotor blades and may be either an appendage to the blade or, preferably, a previously radioactively irradiated radial segment of the blade. A radiation collimator, illustrated schematically at 71, is interposed between the radioactive emitter 70 and the body 13 to collect and focus the radiation from the emitter into a discrete area. Mounted in fixed position on the body 13 in the plane of rotation of the rotor 19 is a radiation detector, illustrated schematically at 72, which senses radiation by manifesting a pulse of electromotive force. The radiation detector 72 may be of any conventional type, such as a semi-conductor having a shallow diffused p-n junction operated with reverse bias to form a space-charge region that functions as a fast solid state ionization chamber setting up a pulse of current in a circuit in response to radiation. If this type of radiation detector is used, the p-n junction of the semi-conductor is situated as far into the body 13 as possible to minimize the shielding effect of the material of the body interposed between the junction and the collimator, and preferably the semi-conductor extends through the material of the body 13 so that it is exposed directly to the interior flow passage 14 of the body 13 to minimize shielding. This embodiment is advantageous because of its simplicity and reliability and because the measuring apparatus 12 may be simplified as a result of the sensing being a single discrete pulse of current for each complete revolution of the rotor. The second rotor 27 has separate sensing means identical to that above described for the first rotor 19. In this embodiment, the sensing means for each rotor are oriented relative to the body and relative to each other in the same manner as above described for the sensing means illustrated in FIGS. 1 and 2, and the current pulse received from the sensing means for the first rotor 19 and the current pulse received from the sensing means for the second rotor 27 are utilized in the same manner as described above for the embodiment of the sensing means illustrated in FIG. 2.

The measuring means 12 for the meter 11 varies depending upon the type of sensing means employed. In general, the measuring means 12 consists of conventional equipment readily available in various forms to perform specified functions, so a description of the measuring equipment 12 for each embodiment of the sensing means will be given in general functional terms.

For the embodiment of sensing means illustrated in FIG. 1, the measuring means 12 consists of a differentiator-amplifier 80, 81 in circuit with each sensing means 50, 51. Each differentiator-amplifier functions to emit a discrete, amplified signal pulse responsive to a given cyclic condition of the alternating current pulse received from the sensing means. Each differentiator-amplifier so signals responsive to the same cyclic condition of the alternating current pulse received from the sensing means 50 or 51, which condition is preferably the positive crossover point where the current pulse changes from negative to positive. Consequently, the differentiator-amplifier for each sensing means converts the alternating current pulse received from the sensing means to which it is connected into a single, discrete amplified signal. The signals from the differentiator-amplifiers 80, 81 are fed to a gate 82 through appropriate circuitry. The gate 82 is in circuit with a high frequency pulse generator 83. The high frequency pulse generator 83 functions to feed high frequency continuous pulses into the gate 82, and the gate 82 functions responsive to the signals received from the differentiator-amplifiers 80, 81 to transmit the high frequency pulses to a counter-timer 84 responsive to reception of the signal from the differentiator-amplifier 80 and to cut off the high frequency pulses so fed to the counter-timer 84 upon reception of the next following signal from the differentiator-amplifier 81. The counter-timer 84 manifests the phase difference of the current pulses from the first sensing means and the second sensing means 51 in terms of the time duration of the high frequency pulses received through the gate. This time duration is directly proportional to the quotient of the angular displacement of one rotor relative to the other about their axis of rotation divided by their speed of angular rotation. The number of such signals per unit time, or frequency thereof, is also manifested by the counter-timer 84, and this is a direct indication of the rotational speed of the two rotors.

For the embodiment of the sensing means illustrated in FIG. 2, the measuring means 12 may be the same as that above described for the sensing means illustrated in FIG. 1, except that the differentiator-amplifier for each sensing means need only produce a signal in response to the unidirectional pulse received from the sensing means for each predetermined discrete amount of rotational angular movement of the rotor.

The measuring apparatus 12 for the embodiment of the sensing means illustrated in FIG. 3, may again, in general, be similar to that above described for the sensing apparatus illustrated in FIG. 1 except that the differentiator-amplifier for each sensing means need be only an amplifier, since no discrimination is necessary as a consequence of the sensing means sending a direct current pulse responsive to each complete rotation of the rotor with which the sensing means is associated.

It is to be understood that the measuring means 12 may take many different embodiments of conventional apparatus, it being necessary only that the measuring means function to manifest the time interval between the pulses from the sensing means for each predetermined discrete amount of rotational angular movement of each rotor and to manifest the frequency of such pulses.

The invention is not to be understood as restricted to the details set forth above since these may be modified within the scope of the appended claims without departing from the spirit of the invention.

I claim:

A fluid mass flow rate meter comprising a body defining an internal flow passage extending through the body and adapted to define axial flow of fluids therethrough, coaxial axially spaced first and second bladed rotors adapted to rotate at different rotational speeds responsive to the same fluid flow rotationally mounted within the flow passage with their axis parallel to the axis of the flow passage for rotation responsive to fluid flow, means rotating with the rotors for coupling the first and second rotors together torsionally deflectionally for equal rotational speeds, whereby fluid flow through the flow passage causes the first and second rotors to rotate at the same rotational speed with angular displacement therebetween about their axis, means for sensing cyclically rotational motion of each rotor, means responsive to the sensing for indicating a time interval directly proportional to the quotient of the angular displacement of the first and second rotors about their axis divided by the rotational speed of the rotors, whereby the quotient so indicated is directly proportional to the mass flow rate of the fluid, the means for coupling including a first cylindrical sleeve extending coaxially from the first rotor toward the second rotor with its end disposed intermediate the two rotors and a second cylindrical sleeve extending coaxially from the second rotor toward the first rotor with its end portion disposed over the end of the first sleeve intermediate the two rotors, a helix of resiliently yieldable wire disposed within the sleeves concentrically with the axis of rotation of the rotors and extending between the rotors with one end attached to the first rotor and the other end attached to the second rotor, apertures in the first sleeve and in the second sleeve communicating between the exterior and interior of each sleeve, and outwardly extending planar projections within each sleeve, whereby motion of the sleeves relative to each other is damped when there is liquid flow.

References Cited in the file of this patent

UNITED STATES PATENTS

| | | |
|---|---|---|
| 2,308,950 | Hulslander | Jan. 19, 1943 |
| 2,683,224 | Cole | July 6, 1954 |
| 2,857,761 | Bodge | Oct. 28, 1958 |
| 2,896,084 | MacDonald | July 21, 1959 |
| 2,943,487 | Potter | July 5, 1960 |
| 3,043,143 | Hollman | July 10, 1962 |